(12) United States Patent
Ogura

(10) Patent No.: US 11,677,888 B2
(45) Date of Patent: Jun. 13, 2023

(54) TERMINAL DEVICE CONTROL METHOD, TERMINAL DEVICE, AND RECORDING MEDIUM HAVING PROGRAM STORED THEREON FOR RECEIVING INFORMATION FROM AN EXTERNAL DEVICE

(71) Applicant: Seiko Instruments Inc., Chiba (JP)

(72) Inventor: Tomoki Ogura, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 0 days.

(21) Appl. No.: 17/494,135

(22) Filed: Oct. 5, 2021

(65) Prior Publication Data

US 2022/0107764 A1 Apr. 7, 2022

(30) Foreign Application Priority Data

Oct. 6, 2020 (JP) .............................. JP2020-169198

(51) Int. Cl.
*H04N 1/00* (2006.01)
*G06F 3/0481* (2022.01)
*G06F 3/12* (2006.01)

(52) U.S. Cl.
CPC ....... *H04N 1/00938* (2013.01); *G06F 3/0481* (2013.01); *G06F 3/1206* (2013.01);
(Continued)

(58) Field of Classification Search
None
See application file for complete search history.

(56) References Cited

U.S. PATENT DOCUMENTS

2012/0290966 A1\* 11/2012 Chae ..................... G06F 3/0481
715/778
2014/0108950 A1 4/2014 Lee et al.
(Continued)

FOREIGN PATENT DOCUMENTS

JP 2014-139718 A 7/2014

OTHER PUBLICATIONS

Extended European Search Report in Europe Application No. 21201178.7, dated Mar. 1, 2022, 8 pages.

*Primary Examiner* — Miya J Williams
(74) *Attorney, Agent, or Firm* — Crowell & Moring LLP

(57) ABSTRACT

A terminal device control method includes: a window mode information acquisition step of acquiring window mode information indicating any one of a single-window mode, which is a mode in which one application runs, and a multi-window mode, which is a mode in which a plurality of applications run in parallel, for a screen of a terminal device configured to cause an external device to perform operation by communicating to/from the external device; a switching step of making a switch, in a case in which the window mode information acquired in the window mode information acquisition step indicates the multi-window mode, to enable or disable a first operation, which is an operation to be performed at least in a time period in which a first application for causing the external device to perform operation runs, and is an operation regarding information to be transmitted from the external device to the terminal device; and a first operation execution step of executing the first operation in a case in which the switch has been made to enable the first operation in the switching step.

9 Claims, 4 Drawing Sheets

(52) U.S. Cl.
CPC .......... *G06F 3/1247* (2013.01); *G06F 3/1285* (2013.01); *H04N 1/0096* (2013.01); *H04N 1/00941* (2013.01); *H04N 1/00949* (2013.01); *H04N 1/00954* (2013.01)

(56) References Cited

U.S. PATENT DOCUMENTS

| | | |
|---|---|---|
| 2014/0164939 A1 | 6/2014 | Tamura |
| 2015/0281388 A1 | 10/2015 | Mori |
| 2017/0060798 A1 | 3/2017 | Sakai |
| 2019/0004673 A1* | 1/2019 | Jang ..................... G06F 3/0483 |

* cited by examiner

TERMINAL DEVICE CONTROL METHOD, TERMINAL DEVICE, AND RECORDING MEDIUM HAVING PROGRAM STORED THEREON FOR RECEIVING INFORMATION FROM AN EXTERNAL DEVICE

RELATED APPLICATIONS

This application claims priority to Japanese Patent Application No. 2020-169198, filed on Oct. 6, 2020, the entire content of which is incorporated herein by reference.

BACKGROUND OF THE INVENTION

1. Field of the Invention

The present invention relates to a terminal device control method, a terminal device, and a recording medium having a program stored thereon.

2. Description of the Related Art

There is known an application (hereinafter referred to as "second application") in which printing data is received from an application (hereinafter referred to as "first application"), for example, a web browser, and the printing data is transmitted to a printer directly or after being converted to data for the printer.

In the above-mentioned related-art technology, it is often assumed to use mobile terminals such as an iPad (trademark) and an iPhone (trademark) as terminal devices. In those terminal devices, an application that can run is basically limited to that displayed on a screen, and other applications than the application displayed on the screen are stopped from running.

In a case in which the second application in the above-mentioned related-art technology is to run on the above-mentioned terminal devices in which the application that can run is limited to that displayed on the screen, the second application is stopped from running while the first application runs. Consequently, the second application does not have a "function that requires background operations," such as always monitoring an error status of the printer.

Therefore, in a terminal device having a single-window mode in which an application that can run is limited to that displayed on a screen, and a multi-window mode in which a plurality of applications can run at the same time, even in a case in which the first application and the second application are executed at the same time in the multi-window mode, the second application does not have the "function that requires background operations," and hence the function cannot be achieved.

In view of the above-mentioned problem, in this technical field, it is desired to provide a terminal device control method, a terminal device, and a recording medium having a program stored thereon with which, while an application for causing an external device to perform operation runs, an operation regarding information to be transmitted from the external device to a terminal device depending on a window mode of the terminal device can be performed at the same time.

SUMMARY OF THE INVENTION

According to one embodiment of the present invention, there is provided a terminal device control method, including: a window mode information acquisition step of acquiring window mode information indicating any one of a single-window mode, which is a mode in which one application runs, and a multi-window mode, which is a mode in which a plurality of applications run in parallel, for a screen of a terminal device configured to cause an external device to perform operation by communicating to/from the external device; a switching step of making a switch, in a case in which the window mode information acquired in the window mode information acquisition step indicates the multi-window mode, to enable or disable a first operation, which is an operation to be performed at least in a time period in which a first application for causing the external device to perform operation runs, and is an operation regarding information to be transmitted from the external device to the terminal device; and a first operation execution step of executing the first operation in a case in which the switch has been made to enable the first operation in the switching step.

The above-mentioned terminal device control method according to the one embodiment of the present invention, further includes a received information output step of outputting the information received from the external device to the first application.

The above-mentioned terminal device control method according to the one embodiment of the present invention, further includes a response step of making different responses to an operation performed by the first application for the case in which the switch has been made to enable the first operation in the switching step, and a case in which the switch has been made to disable the first operation in the switching step.

The above-mentioned terminal device control method according to the one embodiment of the present invention, further includes a notification step of providing notification of a mode for the screen of the terminal device.

According to one embodiment of the present invention, there is provided a terminal device, including: a window mode information acquisition module configured to acquire window mode information indicating any one of a single-window mode, which is a mode in which one application runs, and a multi-window mode, which is a mode in which a plurality of applications run in parallel, for a screen of a terminal device configured to cause an external device to perform operation by communicating to/from the external device; a switching module configured to make a switch, in a case in which the window mode information acquired by the window mode information acquisition module indicates the multi-window mode, to enable or disable a first operation, which is an operation to be performed at least in a time period in which a first application for causing the external device to perform operation runs, and is an operation regarding information to be transmitted from the external device to the terminal device; and a first operation execution module configured to execute the first operation in a case in which the switch has been made to enable the first operation by the switching module.

According to one embodiment of the present invention, there is provided a recording medium having stored thereon a program for causing a computer to execute: a window mode information acquisition step of acquiring window mode information indicating any one of a single-window mode, which is a mode in which one application runs, and a multi-window mode, which is a mode in which a plurality of applications run in parallel, for a screen of a terminal device configured to cause an external device to perform operation by communicating to/from the external device; a switching step of making a switch, in a case in which the window mode information acquired in the window mode information acquisition step indicates the multi-window mode, to enable or disable a first operation, which is an operation to be performed at least in a time period in which a first application for causing the external device to perform operation runs, and is an operation regarding information to be transmitted from the external device to the terminal device; and a first operation execution step of executing the first operation in a case in which the switch has been made to enable the first operation in the switching step.

DETAILED DESCRIPTION OF THE PREFERRED EMBODIMENTS

Figure 1:
FIG. 1 is a diagram for illustrating an example of a configuration of a printing system in at least one embodiment of the present invention.

Now, at least one embodiment of the present invention is described in detail with reference to the drawings. FIG. 1 is a diagram for illustrating an example of a configuration of a printing system PS in the at least one embodiment. The printing system PS includes a terminal device 1, a server 2, and a printer 3.

The terminal device 1 reads a web application stored in the server 2, and generates printing data in a web browser based on a result of executing the read web application. The terminal device 1 transmits the generated printing data to the printer 3. The printer 3 executes printing of the printing data received from the terminal device 1. As described above, the terminal device 1 causes an external device to perform operation by communicating to/from the external device.

Figure 2:
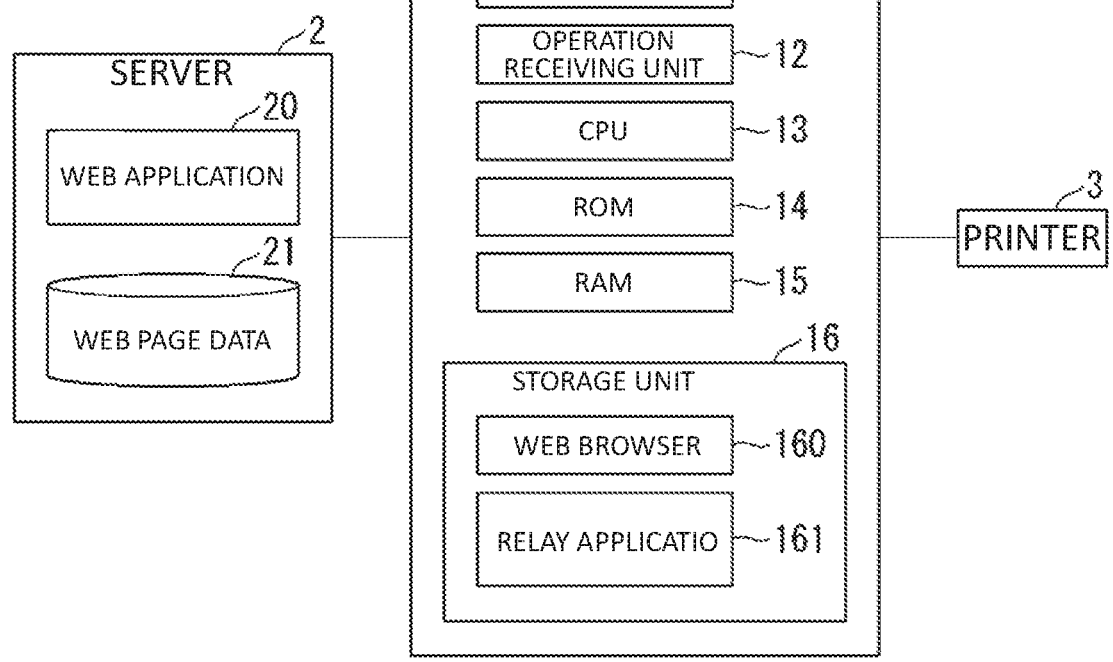
FIG. 2 is a diagram for illustrating an example of a hardware configuration of the printing system in the at least one embodiment of the present invention.

FIG. 2 is a diagram for illustrating an example of a hardware configuration of the printing system PS in the at least one embodiment. The terminal device 1 includes a communication unit 10, a display unit 11, an operation receiving unit 12, a central processing unit (CPU) 13, a read only memory (ROM) 14, a random access memory (RAM) 15, and a storage unit 16.

The communication unit 10 transmits and receives various kinds of information through a network. The terminal device 1 transmits and receives various kinds of information to and from the server 2 and the printer 3 via the communication unit 10. The communication unit 10 includes a communication interface (I/F) for performing communication through the network. The communication unit 10 communicates to/from the printer 3 with use of, as an example, a universal serial bus (USB). The communication unit 10 may use short-range wireless communication, for example, Bluetooth Classic (trademark) or Bluetooth Low Energy (trademark) for the communication to/from the printer 3. Alternatively, the communication unit 10 may use a wired or wireless local area network (LAN) for the communication to/from the printer 3. Still alternatively, the communication unit 10 may use serial communication for the communication to/from the printer 3. The communication unit 10 may use another kind of communication than the above-mentioned communication for the communication to/from the printer 3. The communication unit 10 uses, for example, a wireless LAN for communication to/from the server 2. The communication unit 10 may use another kind of communication than the wireless LAN for the communication to/from the server 2.

The display unit 11 displays various kinds of information. The display unit 11 includes, for example, a liquid crystal display or an organic electroluminescence (EL) display. The operation receiving unit 12 receives various operations from a user. The operation receiving unit 12 includes, for example, a touch panel. The touch panel included in the operation receiving unit 12 may be provided integrally with the liquid crystal display included in the display unit 11. The operation receiving unit 12 may include operation buttons, a mouse, or a keyboard, for example.

The CPU 13 reads a program from the ROM 14, and executes various kinds of control in accordance with the read program. The CPU 13 includes a plurality of internal storage media such as registers. The CPU 13 temporarily stores data from the ROM 14 in the internal storage media, and computes the data. The CPU 13 outputs a computation result to a register, and further from the register to the ROM 14 or an external storage medium. The ROM 14 is a main memory device storing various programs, data, and parameters used by the CPU 13 in performing various kinds of computation and control.

The storage unit 16 stores various kinds of information such as applications. The storage unit 16 is formed by using a storage device, for example, a semiconductor storage device. The storage unit 16 may include a magnetic hard disk drive. The storage unit 16 stores, as an example, a web browser 160 and a relay application 161. The web browser 160 communicates to/from a web application 20 included in the server 2, and displays an execution result of the web application 20. On the web browser 160, as an example, a point of sale (POS) program runs using a program that runs on a web browser, for example, JavaScript. Another language than JavaScript may be used for the program that runs on the web browser.

As a first application 133, an application generated by the user may be used, for example, instead of the web browser. Further, in the first application 133, various programs such as a script, an intermediate representation, and a plug-in may be used. Those various programs may be included in web page data WP, which is acquired (downloaded) from the server 2, and is to be described later.

The relay application 161 converts printing data PD1 based on an HTTP protocol, which is generated in the web browser 160, into a format in which printing can be executed by the printer 3. The relay application 161 also performs a background operation. The term "background operation" in the at least one embodiment is an operation to be performed the at least in a time period in which the first application 133 for causing the printer 3 to perform operation runs, and is an operation regarding information to be transmitted from the printer 3 to the terminal device 1. In other words, the term "background operation" in the at least one embodiment is an operation or processing to be executed in the background while the first application 133 runs in a multi-window mode. The background operation is an example of a first operation.

The server 2 includes the web application 20. The server 2 also stores web page data 21 to be displayed in the web application 20.

Figure 3:
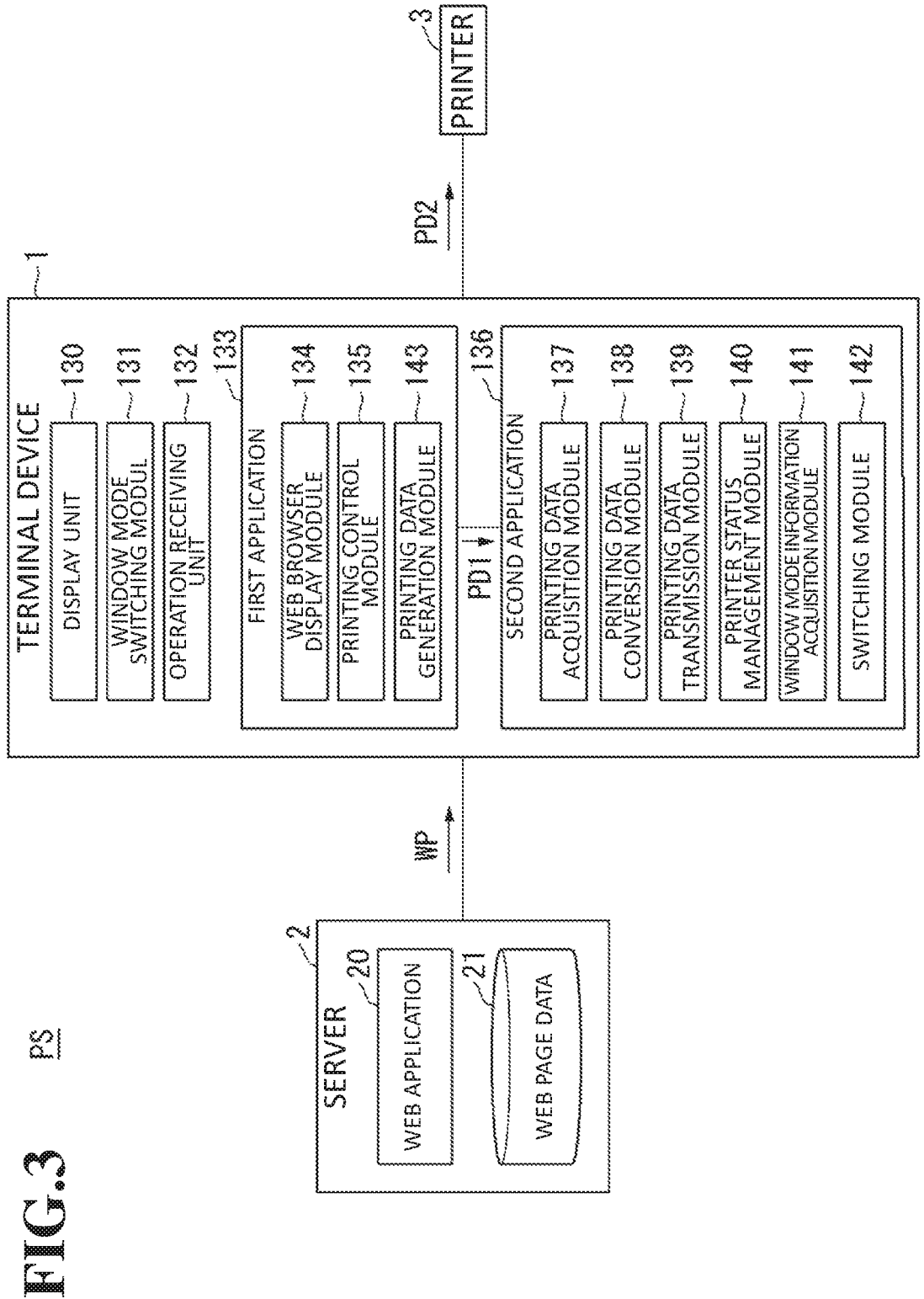
FIG. 3 is a diagram for illustrating an example of a functional configuration of the printing system in the at least one embodiment of the present invention.

FIG. 3 is a diagram for illustrating an example of a functional configuration of the printing system PS in the at least one embodiment. The terminal device 1 includes a display control module 130, a window mode switching module 131, an operation information supply module 132, the first application 133, and a second application 136. Each of the display control module 130, the window mode switching module 131, the operation information supply module 132, the first application 133, and the second application 136 is achieved, for example, by the CPU 13 reading a program from the ROM 14 and/or the storage unit 16 and executing processing. The display control module 130, the window mode switching module 131, and the operation information supply module 132 are achieved by being incorporated, as an example, in an operating system (OS) of the terminal device 1.

The display control module 130 controls the display unit 11. The window mode switching module 131 switches a mode of a window to be displayed on the display unit 11. The mode of the window to be displayed on the display unit 11 includes a single-window mode and a multi-window mode. The single-window mode is a mode in which a window of one application is displayed on the display unit 11, and the one application runs. The multi-window mode is a mode in which windows of a plurality of applications are displayed on the display unit 11, and the plurality of applications run in parallel. The window mode switching module 131 generates window mode information indicating any one of the single-window mode and the multi-window mode depending on a result of switching the modes.

In the multi-window mode, the display control module 130 displays the respective windows of the plurality of applications by, for example, dividing the entire screen of the display unit 11. In the multi-window mode, the display control module 130 may display the windows of the plurality of applications in a plurality of regions of the screen of the display unit 11, respectively.

The operation information supply module 132 communicates various operations received by the operation receiving unit 12 to other functional modules. The various operations received by the operation receiving unit 12 are input, for example, through a user interface of each application.

The first application 133 is a web browser as an example. The first application 133 is achieved by the CPU 13 executing the web browser 160 stored in the storage unit 16. The first application 133 includes a web browser display module 134, a printing control module 135, and a printing data generation module 143.

The web browser display module 134 communicates to/from the web application 20 included in the server 2, and displays an execution result of the web application 20. The printing control module 135 receives an operation in which a print button displayed on the web browser 160 is pressed (region in which the print button is displayed on the touch panel is tapped) by the user. When the operation in which the print button displayed on the web browser 160 is displayed is pressed is received by the printing control module 135, the printing data generation module 143 generates the printing data PD1.

The second application 136 is a relay application. The second application 136 is achieved by the CPU 13 executing the relay application 161 stored in the storage unit 16. The second application 136 includes a printing data acquisition module 137, a printing data conversion module 138, a printing data transmission module 139, a printer status management module 140, a window mode information acquisition module 141, and a switching module 142.

The printing data acquisition module 137 acquires the printing data PD1 from the first application 133. Here, the printing data PD1 is transferred between the first application 133 and the second application 136 by a URL scheme, for example. In other words, the printing data acquisition module 137 acquires the printing data PD1 from the first application 133 based on the URL scheme. The printing data PD1 may be transferred between the first application 133 and the second application 136 through interprocess communication in the terminal device 1, or another method may be used for the transfer.

Alternatively, the printing data PD1 may be supplied via the server 2 instead of being directly supplied from the first application 133 to the second application 136. In that case, after the printing data PD1 is once output from the first application 133 to the server 2, the printing data PD1 is converted as required, and the printing data PD1 is supplied from the server 2 to the second application 136. In that case, the printing data acquisition module 137 acquires the printing data PD1 from the server 2, or printing data PD2 obtained after the conversion.

The printing data conversion module 138 converts the printing data PD1 acquired by the printing data acquisition module 137 into a format in which printing can be executed by the printer 3. The printing data transmission module 139 transmits to the printer 3 the printing data PD2 obtained after the conversion by the printing data conversion module 138.

The second application 136 may transmit the printing data PD1 acquired from the first application 133 to the printer 3 without converting the printing data PD1. In that case, the printing data acquisition module 137 supplies the printing data PD1 acquired from the first application 133 to the printing data transmission module 139. The printing data transmission module 139 transmits the printing data PD1 supplied from the printing data acquisition module 137 to the printer 3.

The printer status management module 140 performs a background operation. In the at least one embodiment, the printer status management module 140 performs, as an example, polling processing as the background operation on the printer 3.

The window mode information acquisition module 141 acquires the window mode information from the window mode switching module 131. In a case in which the window mode information indicates the multi-window mode, the switching module 142 makes a switch to enable or disable operation of the printer status management module 140.

The server 2 supplies the web page data WP to the terminal device 1. Here, the server 2 supplies, in response to a request from the web browser display module 134 of the terminal device 1, the web page data WP of the web page data 21 to the web browser display module 134 of the terminal device 1.

The printer 3 receives the printing data PD2 transmitted from the terminal device 1, and executes printing based on the received printing data PD2. The printer 3 receives from the terminal device 1 the printing data PD2 of a protocol corresponding to a communication standard of the own device. Therefore, it is not required for the printing system PS to have a configuration adapted to HTTP by including an HTTP server, for example. Further, in a case in which an error occurs in the processing of receiving the printing data PD2 or the processing of printing the printing data PD2, the printer 3 notifies the terminal device 1 that an error has occurred together with details of the error.

Figure 4:
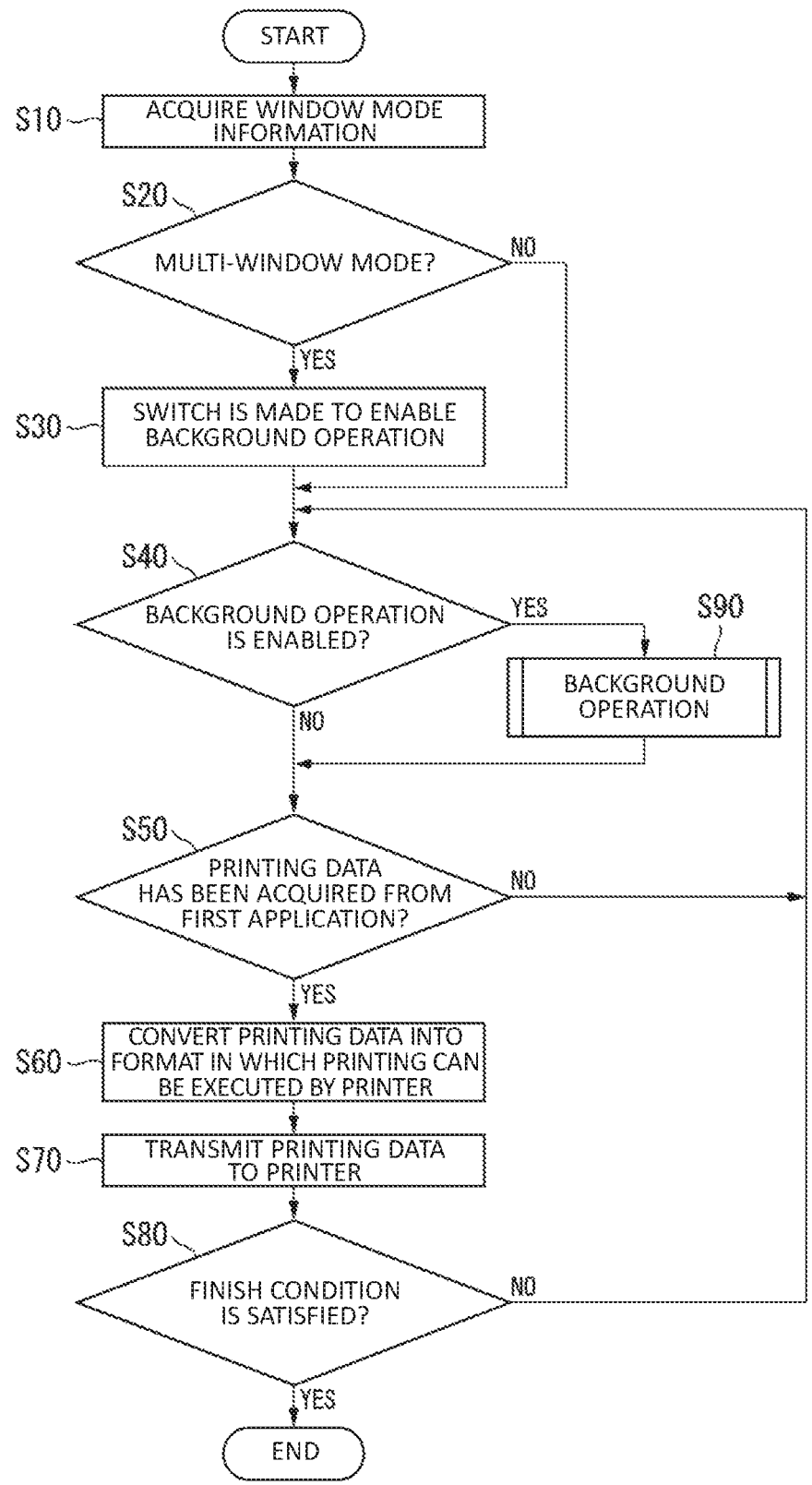
FIG. 4 is a flow chart for illustrating an example of a terminal device control method to be performed by a second application in the at least one embodiment of the present invention.
Figure 5:
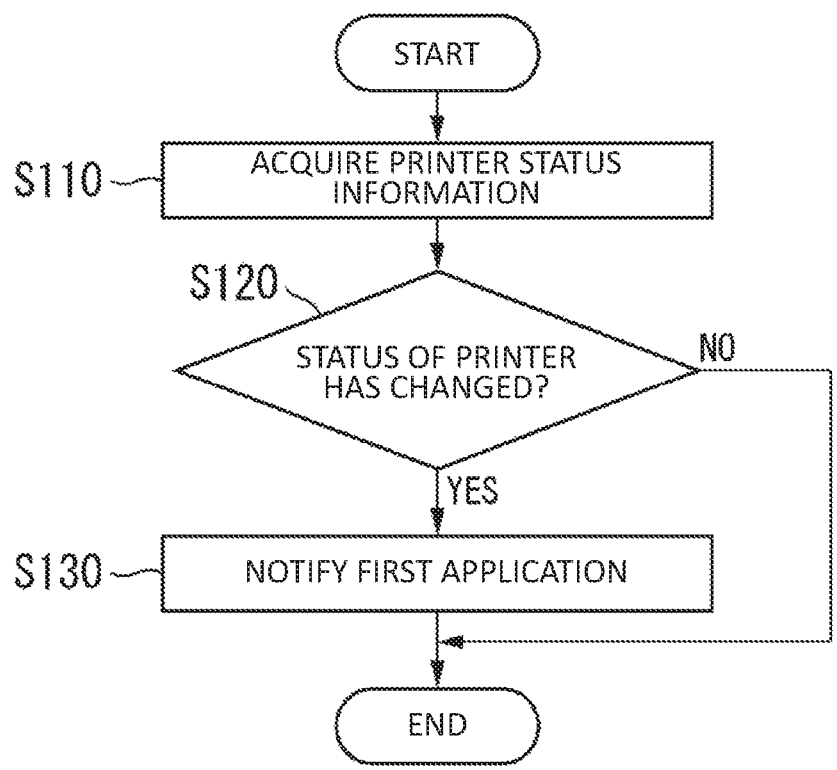
FIG. 5 is a flow chart for illustrating an example of a background operation in the at least one embodiment of the present invention.

Now, referring to FIG. 4 and FIG. 5, description is given of details of a terminal device control method to be performed by the second application 136. FIG. 4 is a flow chart for illustrating an example of the terminal device control method to be performed by the second application 136 in the at least one embodiment.

Step S10 (window mode information acquisition step): The window mode information acquisition module 141 acquires the window mode information from the window mode switching module 131. Here, when the window mode switching module 131 switches a window mode, information on the switched window mode is supplied from the window mode switching module 131 to the window mode information acquisition module 141. The window mode information acquisition module 141 supplies the acquired window mode information to the switching module 142.

Step S20 (switching step): The switching module 142 determines whether the window mode is the multi-window mode. The switching module 142 makes the determination based on the window mode information acquired by the window mode information acquisition module 141. In a case of determining that the window mode is the multi-window mode (Step S20: YES), the switching module 142 makes a switch to enable the background operation (Step S30). In contrast, in a case in which the switching module 142 determines that the window mode is the single-window mode (Step S20: NO), the second application 136 executes a processing step of Step S40.

In the at least one embodiment, description has been given of an example of a case in which, in Step S20 and Step S30, the switching module 142 makes the determination as to whether the window mode is the multi-window mode based on the window mode information supplied from the window mode information acquisition module 141. In other words, in the at least one embodiment, description has been given of an example of a case in which the second application 136 detects the window mode automatically with use of the information from the OS, but the present invention is not limited thereto. An operation for making a switch to enable or disable the background operation may be performed on a user interface of the second application 136 by the user, and the switching module 142 may make a switch to enable or disable the polling processing based on the operation. The operation is supplied from the operation information supply module 132 to the switching module 142. In that case, the second application 136 may determine the window mode based on the window mode information supplied from the window mode information acquisition module 141, and in the case of the single-window mode, may prevent the operation for making the switch to enable or disable the background operation from being made from the user interface.

Alternatively, the switching module 142 may make the switch to enable or disable the background operation based on an instruction provided by communication from the first application 133. In this case, in the case of the single-window mode as a result of the second application 136 determining the window mode based on the window mode information supplied from the window mode information acquisition module 141, when the switching module 142 receives the instruction to enable the background operation from the first application 133, the switching module 142 displays an error, for example. Alternatively, when the instruction to enable the background operation from the first application 133 is received in the single-window mode, the switching module 142 may notify the first application 133 that the background operation cannot be enabled because of the single-window mode.

Step S40: The printer status management module 140 determines whether the background operation is enabled. The printer status management module 140 makes the determination based on a result of switching by the switching module 142. In a case of determining that the background operation is enabled (Step S40: YES), the printer status management module 140 executes the background operation (Step S90). In other words, in the case in which the switching module 142 has made the switch to enable the background operation, the printer status management module 140 executes the background operation. Step S90 is an example of a first operation execution step. After executing the background operation, the second application 136 executes a processing step of Step S50.

In contrast, in a case in which the printer status management module 140 determines that the background operation is not enabled (Step S40: NO), the printer status management module 140 does not execute the background operation, and the second application 136 executes a processing step of Step S50.

In the case of determining that the background operation is not enabled, the printer status management module 140 may notify the first application 133 that the background operation is not enabled. In the case in which the background operation is disabled, the first application 133 can perform processing corresponding to that case. In other words, the operation of the first application 133 may be different depending on whether the background operation of the second application 136 is enabled or disabled.

Step S50: The printing data acquisition module 137 determines whether the printing data PD1 has been acquired from the first application 133. After generating the printing data PD1, the printing data generation module 143 supplies the generated printing data PD1 to the printing data acquisition module 137. In a case in which the printing data PD1 is supplied from the printing data generation module 143, the printing data acquisition module 137 acquires the printing data PD1. In the case of determining that the printing data PD1 has been acquired (Step S50: YES), the printing data acquisition module 137 supplies the acquired printing data PD1 to the printing data conversion module 138. In contrast, in a case of determining that the printing data PD1 has not been acquired (Step S50: NO), the printing data acquisition module 137 executes the processing step of Step S40 again.

Step S60: The printing data conversion module 138 converts the printing data PD1 acquired by the printing data acquisition module 137 into a format in which printing can be executed by the printer 3. In this example, the printing data conversion module 138 converts the printing data PD1 based on an HTTP protocol generated in the first application 133, which is the web browser, into the printing data PD2 of the protocol corresponding to the communication standard of the printer 3. The printing data conversion module 138 generates the printing data PD2 as a result of the conversion.

Step S70: The printing data transmission module 139 transmits the printing data PD2 obtained as the result of the conversion by the printing data conversion module 138 to the printer 3 via the communication unit 10.

Step S80: The second application 136 determines whether a finish condition is satisfied. The finish condition is, for example, that an operation of finishing the second application 136 is performed by the user, and the operation is communicated from the operation information supply module 132 to the second application 136. In a case of determining that the finish condition is satisfied (Step S80: YES), the second application 136 ends the processing. In contrast, in a case of determining that the finish condition is not satisfied (Step S80: NO), the second application 136 executes the processing step of Step S40 again.

Now, referring to FIG. 5, details of the background operation denoted as Step S90 are described. As described above, in the at least one embodiment, the printer status management module 140 performs the polling processing as the background operation on the printer 3. The polling processing includes, for example, processing of monitoring a connection status of the printer 3, processing of monitoring an error status of the printer 3, processing of monitoring various kinds of data transmitted from the printer 3, and processing to be performed in a case in which a change in status of the printer 3 is detected.

In the processing of monitoring the connection status of the printer 3, the connection status for the communication between the terminal device 1 and the printer 3 is detected in the terminal device 1. In the processing of monitoring the error status of the printer 3, status data to be transmitted from the printer 3 in the case in which an error occurs in the printer 3 is detected. In the processing of monitoring various kinds of data transmitted from the printer 3, response data to various commands transmitted to the printer 3, or data transmitted via the printer 3 from a peripheral device or accessory connected to the printer 3 is detected. In the processing to be performed in the case in which a change in status of the printer 3 is detected, the first application 133 is notified of the detected change, the detected change is displayed on a web browser of the second application 136, or operation to be performed in a case in which the printing data PD1 is acquired from the first application 133 thereafter is changed based on the detected change. When detecting that the server 2 is in an error status, for example, the printer status management module 140 notifies the first application 133 of the error.

FIG. 5 is a flow chart for illustrating an example of the background operation in the at least one embodiment. A processing step of each of Step S110, Step S120, and Step S130 illustrated in FIG. 5 is executed as the background operation of Step S90 illustrated in FIG. 4.

Step S110: The printer status management module 140 acquires printer status information from the communication unit 10. The printer status information is information indicating a status of the printer 3. The printer status information is generated and updated by the communication unit 10. For example, when the terminal device 1 newly receives data, for example, an error message, from the printer 3, information indicating that the data has been received is added to the printer status information by the communication unit 10. Alternatively, when the communication between the terminal device 1 and the printer 3 is disconnected, information indicating that the communication has been disconnected is added to the printer status information by the communication unit 10. Instead of adding, to the printer status information, the data that has been newly received from the printer 3, the printer status information may be updated with the data.

Step S120: The printer status management module 140 determines whether the status of the printer 3 has changed. The printer status management module 140 makes the determination based on the printer status information acquired from the communication unit 10. In a case of determining that the status of the printer 3 has changed (Step S120: YES), the printer status management module 140 executes the processing step of Step S130. In contrast, in a case of determining that the status of the printer 3 has not changed (Step S120: NO), the printer status management module 140 ends the background operation.

Step S130: The printer status management module 140 notifies the first application 133 of details of the change in status of the printer 3. For example, the printer status management module 140 notifies the first application 133 of the error message received from the printer 3. Alternatively, the printer status management module 140 may display the details of the change in status of the printer 3 on the second application 136. In that case, the printer status management module 140 causes, via the display control module 130, for example, the display unit 11 to display the error message received from the printer 3. Then, the printer status management module 140 ends the background operation.

As described above, the printer status management module 140 outputs information, for example, the error message received from the printer 3, to the first application 133. This operation performed by the printer status management module 140 is an example of a received information output step. The first application 133 may monitor the status of the printer 3 based on the notified information, for example, the error message.

The processing to be performed in the case in which it is determined that the background operation is enabled is not limited to the processing described above. For example, the printer status management module 140 may execute, as event processing, operation similar to the polling processing described above as the background operation. Alternatively, the printer status management module 140 may execute, as the background operation, the polling processing and the event processing in combination.

Further, as the processing to be performed in the case in which it is determined that the background operation is enabled, the following processing may be executed, for example. For example, in such communication that is performed by switching between a connected state and a disconnected state, as in TCP/IP communication or Bluetooth (trademark), in the case of determining that the background operation is enabled, the second application 136 performs the background operation while maintaining the communication to/from the printer 3 without disconnecting the communication. In contrast, in the case of determining that the background operation is disabled, when acquiring the printing data PD1 from the first application 133, the second application 136 performs connection for the communication to/from the printer 3, and after transmitting the printing data PD2 to the printer 3, disconnects the communication to/from the printer 3. Through this processing, in the case in which it is determined that the background operation is disabled, power consumption accompanying the communication to/from the printer 3 can be reduced.

In other words, the second application 136 makes different responses to the operation performed by the first application 133 for the case in which the switch has been made to enable the background operation, and the case in which the switch has been made to disable the background operation by the switching module 142. This operation performed by the second application 136 is an example of a response step.

The second application 136 may provide to the user a notice that, when the window mode is switched, the background operation is stopped. In the case in which the background operation is stopped when the window mode is switched from the multi-window mode to the single-window mode by the user, the second application 136 may display, for a predetermined period of time immediately after the second application 136 has started, an alert (for example, a text that reads: "maintain the multi-window mode, and do not switch to the single-window mode") on the display unit 11. Alternatively, the second application 136 may continue to display the alert on the display unit 11 while the second application 136 runs.

In other words, the second application 136 may provide a notification on the mode of the screen of the display unit 11 of the terminal device 1. This operation performed by the second application 136 is an example of a notification step.

Further, in a case in which, after the window mode is switched to the single-window mode, the second application 136 can run for a predetermined period of time in the terminal device 1, an alert prompting for switching of the window mode back to the multi-window mode may be displayed on the display unit 11 for the predetermined period of time.

As described above, the terminal device control method according to the at least one embodiment includes the window mode information acquisition step, the switching step, and the first operation execution step. In the window mode information acquisition step (in the at least one embodiment, Step S10), the second application 136 acquires, by communicating to/from the external device (in the at least one embodiment, printer 3), the window mode information indicating any one of the single-window mode, which is the mode in which one application runs on the screen (in the at least one embodiment, display unit 11) of the terminal device 1 for causing the external device (in the at least one embodiment, printer 3) to perform operation, and the multi-window mode, which is the mode in which a plurality of applications run in parallel. In the switching step (in the at least one embodiment, Step S30), in the case in which the window mode information acquired in the window mode information acquisition step (in the at least one embodiment, Step S10) indicates the multi-window mode, the second application 136 makes the switch to enable or disable the first operation (in the at least one embodiment, background operation), which is the operation to be performed the at least in a time period in which the first application 133 for causing the external device (in the at least one embodiment, printer 3) to perform operation runs, and is the operation regarding the information to be transmitted from the external device (in the at least one embodiment, printer 3) to the terminal device 1. In the first operation execution step (in the at least one embodiment, Step S90), in the case in which the switch has been made to enable the first operation (in the at least one embodiment, background operation) in the switching step (in the at least one embodiment, Step S30), the second application 136 executes the first operation (in the at least one embodiment, background operation).

With this configuration, in the terminal device control method according to the at least one embodiment, the switch can be made to enable or disable the first operation (in the at least one embodiment, background operation), which is the operation regarding the information transmitted from the external device (in the at least one embodiment, printer 3) to the terminal device 1, depending on the window mode of the terminal device 1. Therefore, while the first application 133 for causing the external device (in the at least one embodiment, printer 3) to perform operation runs, the first operation (in the at least one embodiment, background operation) can be executed at the same time depending on the window mode of the terminal device 1. With the terminal device control method according to the at least one embodiment, operation having higher function, that is, the first operation (in the at least one embodiment, background operation), can be provided to the user who generates the first application 133.

With the terminal device control method according to the at least one embodiment, in the case of the multi-window mode, the function that requires the background operation, for example, always monitoring the connection status of the printer 3, always monitoring the error status of the printer 3, or always monitoring the data transmitted from the printer 3, can be achieved. For example, acquisition of response data to a transmitted command, or monitoring of data acquired from a device, for example, a barcode scanner, connected to the printer can be achieved.

With the terminal device control method according to the at least one embodiment, the terminal device 1 can perform two-way communication to/from the external device (in the at least one embodiment, printer 3) through the first operation (in the at least one embodiment, background operation), which is the operation regarding the information transmitted from the external device (in the at least one embodiment, printer 3) to the terminal device 1, without stopping the operation of the first application 133 for causing the external device (in the at least one embodiment, printer 3) to perform operation. The switch is made to enable the first operation (in the at least one embodiment, background operation) in the switching step, and hence the second application 136 can run even in a terminal device (for example, iPhone (trademark)) having only the single-window mode.

The terminal device control method in the at least one embodiment may further include a received information output step. In the received information output step, the second application 136 outputs the information (in the at least one embodiment, error message, for example) received from the external device (in the at least one embodiment, printer 3) to the first application 133. With this configuration, with the terminal device control method according to the at least one embodiment, the information (in the at least one embodiment, error message, for example) received from the external device can be output to the first application 133, and hence the status of the terminal device 1 can be monitored by the first application 133. Consequently, the terminal device control method according to the at least one embodiment is suitably used in a case in which the first application 133 is a POS application.

The terminal device control method according to the at least one embodiment may further include a response step. In the response step, the second application 136 makes different responses to the operation performed by the first application 133 for the case in which the switch has been made to enable the first operation (in the at least one embodiment, background operation) in the switching step (in the at least one embodiment, Step S30), and the case in which the switch has been made to disable the first operation (in the at least one embodiment, background operation) in the switching step. With this configuration, with the terminal device control method according to the at least one embodiment, unnecessary operation can be omitted in the case in which the first operation is disabled for the operation performed by the first application 133. Therefore, operation efficiency can be increased as compared to a case in which the same response is made to the operation performed by the first application 133 irrespective of whether the first operation is enabled or disabled.

The terminal device control method according to the at least one embodiment may further include a notification step. In the notification step, the second application 136 provides a notification on the mode of the screen (in the at least one embodiment, display included in the display unit 11) of the terminal device 1. With this configuration, with the terminal device control method according to the at least one embodiment, the user can be notified to maintain the mode of the screen of the terminal device 1 to the multi-window mode, and hence it is possible to prevent the window mode from being switched from the multi-window mode in the case in which the first operation is performed.

In the at least one embodiment described above, the description has been given of an example of the case in which the POS program runs in the first application 133, which is the web browser 160, but the present invention is not limited thereto. In the first application 133, a cash register application, an inventory management application in, for example, physical distribution, an ATM application, an unattended terminal application, a meter reading operation application, or the like may run.

In the at least one embodiment described above, the description has been given of an example of the case of the printing system PS including the terminal device 1 and the printer 3, but the present invention is not limited thereto. Any control system may be adopted as long as the control system includes an external device, and a terminal device for causing the external device to perform operation by communicating to/from the external device. For example, the control system (printing system PS) in the at least one embodiment described above may include a customer display, a barcode scanner, or a drawer instead of the printer 3.

A part of the terminal device 1 in the at least one embodiment described above, for example, the printer status management module 140, the window mode information acquisition module 141, and the switching module 142, may be achieved by a computer. In this case, a program for achieving control functions thereof may be recorded in a computer-readable recording medium, and the program recorded in the computer-readable recording medium may be read and executed by a computer system, to thereby achieve the control functions. The "computer system" here is a computer system built in the terminal device 1, and includes an OS and hardware such as peripheral equipment. The "computer-readable recording medium" is a portable medium such as a flexible disk, a magneto-optical disk, a ROM, a RAM, or a CD-ROM, a storage device built in the computer system, for example, a hard disk drive. Examples of the "computer-readable recording medium" may also include a medium that holds the program dynamically for a short length of time, such as the Internet or a similar communication network or a phone line or a similar communication line through which the program is transmitted, and a medium that holds the program for a predetermined length of time, such as a volatile memory inside the computer system that serves as a server or a client when the program is transmitted over a communication network or a communication line. The program may be one for achieving some of the functions described above, or may achieve the described functions in combination with a program that is already recorded in the computer system. Alternatively, a part of or all of the terminal device 1 in the at least one embodiment described above may be achieved in the form of an integrated circuit, for example, a large-scale integration (LSI) circuit. The function blocks of the terminal device 1 may be made into processors individually, or some or all of the function blocks may be integrated into a processor. The method of integration is not limited to LSI, and the integration may be accomplished with the use of a dedicated circuit or a general-purpose processor. If a future advance of semiconductor technology produces integration technology that can substitute for LSI, an integrated circuit according to this integration technology may be used.

While a detailed description has been given above of the at least one embodiment of the present invention with reference to the drawings, the specific configuration of the present invention is not limited to the ones described above, and various design modifications and the like can be made without departing from the spirit of the present invention.

What is claimed is:

1. A terminal device control method, comprising:
a window mode information acquisition step of acquiring window mode information indicating any one of a single-window mode, which is a mode in which one application runs on a terminal device, and a multi-window mode, which is a mode in which a plurality of applications run in parallel on the terminal device, for a screen of the terminal device configured to cause an external device to perform operation by communicating to/from the external device;
a switching step of making a switch, in a case in which the window mode information acquired in the window mode information acquisition step indicates the multi-window mode, to enable or disable a first operation, which is an operation to be performed at least in a time period in which a first application for causing the external device to perform operation runs on the terminal device, and is an operation regarding information to be transmitted from the external device to the terminal device;
a first operation execution step of executing the first operation in a case in which the switch has been made to enable the first operation in the switching step;
receiving, by the first application, the information transmitted from the external device to the terminal device;
transmitting, by the first application, to a second application run on the terminal device, information relating to the information transmitted form the external device; and
displaying, by the second application on the screen of the terminal device, visual information relating to the information transmitted from the external device.

2. The terminal device control method according to claim 1, further comprising a response step of making different responses to an operation performed by the first application for the case in which the switch has been made to enable the first operation in the switching step, and a case in which the switch has been made to disable the first operation in the switching step.

3. The terminal device control method according to claim 1, further comprising a notification step of providing notification of a mode for the screen of the terminal device.

4. The terminal device control method according to claim 1, wherein the first operation comprises the terminal device polling the external device.

5. The terminal device control method according to claim 1, wherein the external device comprises a printer.

6. The terminal device control method according to claim 5, wherein the information to be transmitted from the external device to the terminal device comprises a printer error message.

7. The terminal device control method according to claim 1, further comprising:
providing, by the first application via the screen of the terminal device, a notification prompt to switch back to the multi-window mode in response to switching to the single-window mode.

8. A terminal device, comprising:
at least one processor configured to:
- acquire window mode information indicating any one of a single-window mode, which is a mode in which one application runs on the terminal device, and a multi-window mode, which is a mode in which a plurality of applications run in parallel on the terminal device, for a screen of the terminal device, wherein the terminal device is configured to cause an external device to perform operation by communicating to/from the external device;
- make a switch, in a case in which the window mode information indicates the multi-window mode, to enable or disable a first operation, which is an operation to be performed at least in a time period in which a first application for causing the external device to perform operation runs on the terminal device, and is an operation regarding information to be transmitted from the external device to the terminal device;
- execute the first operation in a case in which the switch has been made to enable the first operation;
- receive, in the first application, the information transmitted from the external device to the terminal device;
- communicate, from the first application to a second application run on the terminal device, information relating to the information transmitted from the external device; and
- display, by the second application on the screen of the terminal device, visual information relating to the information transmitted from the external device.

9. A non-transitory recording medium having stored thereon a program for causing a computer to execute:
- a window mode information acquisition step of acquiring window mode information indicating any one of a single-window mode, which is a mode in which one application runs on a terminal device, and a multi-window mode, which is a mode in which a plurality of applications run in parallel on the terminal device, for a screen of the terminal device configured to cause an external device to perform operation by communicating to/from the external device;
- a switching step of making a switch, in a case in which the window mode information acquired in the window mode information acquisition step indicates the multi-window mode, to enable or disable a first operation, which is an operation to be performed at least in a time period in which a first application for causing the external device to perform operation runs on the terminal device, and is an operation regarding information to be transmitted from the external device to the terminal device;
- a first operation execution step of executing the first operation in a case in which the switch has been made to enable the first operation in the switching step;
- receiving, by the first application, the information transmitted from the external device to the terminal device;
- transmitting, by the first application, to a second application run on the terminal device, information relating to the information transmitted from the external device; and
- displaying, by the second application on the screen of the terminal device, visual information relating to the information transmitted from the external device.

* * * * *